I claim:

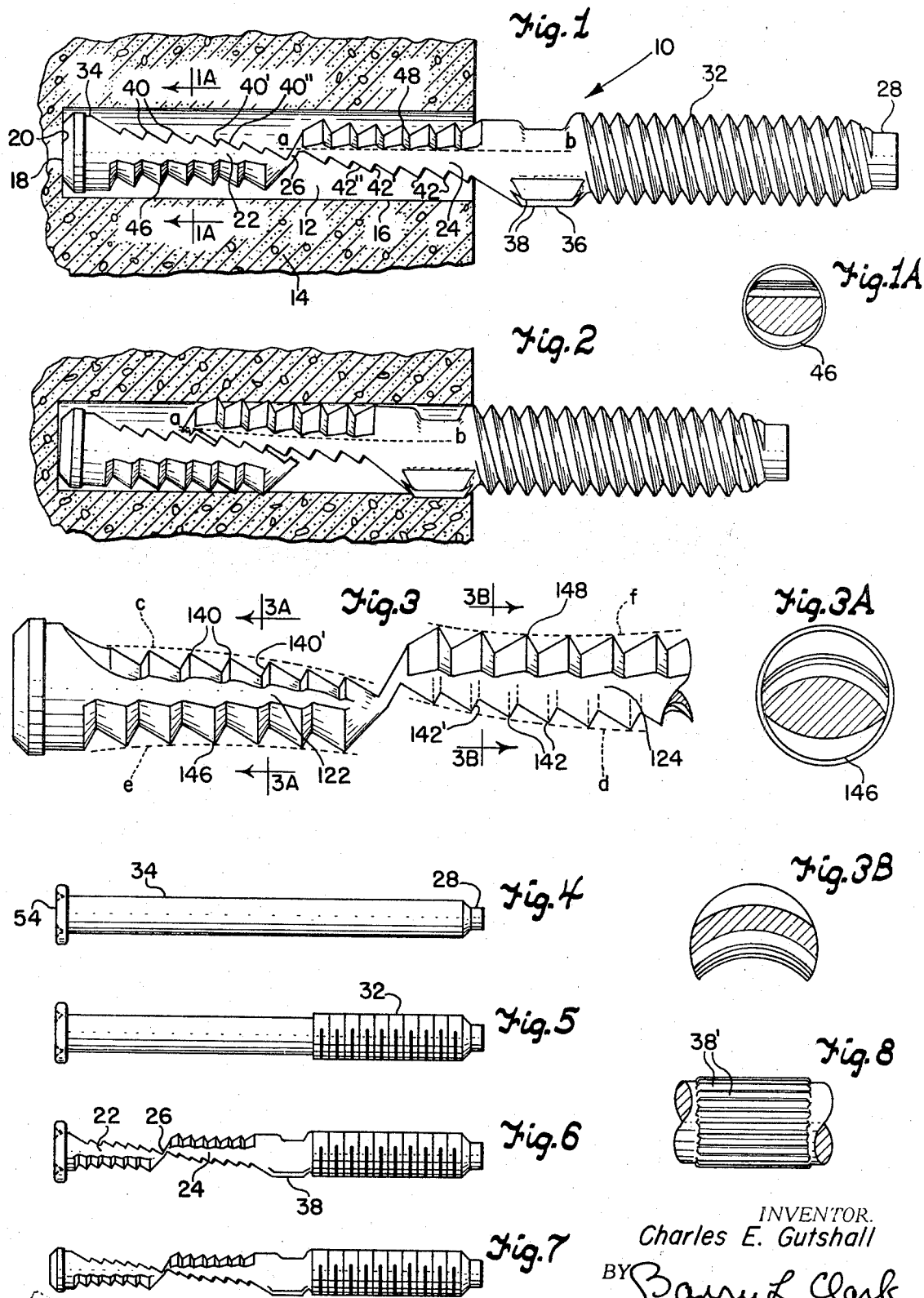

1. A one-piece anchor fastener comprising an elongated shank member having a forward tip portion adapted to be percussively driven against the bottom of a hole formed in a workpiece, said shank having a first of ratchet toothed wedge portions formed on one side thereof adjacent said tip portion and a second set of ratchet toothed wedge portions formed on the opposite side thereof and axially spaced from said first set along said shank, the portion of said shank connecting said first and second sets of ratchet toothed wedge portions being reduced in cross-section relative to the remainder of the shank so as to frangibly connect said first and second sets of ratchet toothed wedge portions and permit said second set of ratchet toothed wedge portions to be separated from and to move past at least a portion of said first set of ratchet toothed wedge portions and cooperate therewith to wedge a portion of the shank against the walls of said hole when said reduced cross-section portion is fractured by a percussive force being applied to the rearward end of the shank, the cooperating ratchet teeth on each of said first and second sets of ratchet toothed wedge portions having the central points of the tips of their teeth defining the locus of points on a pair of convex curved lines.

2. An anchor fastener in accordance with claim 1 wherein said shank has an elongated enlarged diameter portion thereon which is adapted to enter said hole and closely engage the walls thereof as said first and second sets of ratchet toothed wedge portions are percussively driven past each other, said enlarged diameter portion serving to maintain portions of said shank remaining outside said hole in alignment with the axis of said hole while permitting the portion of said shank carrying said second set of ratchet toothed wedge portions to be bent relative to said aligned portions.

3. An anchor fastener in accordance with claim 2 wherein the material of the surface of said shank in the region of said elongated enlarged diameter portion consists of alternate depressed and raised portions.

4. An anchor fastener in accordance with claim 1 wherein said shank includes wall engaging formations on its exterior which are adapted to be driven against the wall of the hole by the movement of the first and second sets of ratchet toothed wedge portions past each other.

5. An anchor fastener in accordance with claim 3 wherein the wall engaging formations comprise a series of wall engaging teeth on each of said first and second sets of ratchet toothed wedge portions.

6. An anchor fastener in accordance with claim 1 wherein said first and second sets of ratchet toothed wedge portions comprise a plurality of complementary shaped teeth which include ramp-like side surfaces which cooperate with each other to permit the teeth on said second set to be driven axially forwardly relative to the teeth of the first set and into interlocking engagement therewith wherein retaining surfaces on each of said teeth arranged generally transverse to the axis of the fastener will prevent retrograde movement of said second set of teeth from a position of engagement with the first set.

7. An anchor fastener in accordance with claim 6 wherein said first and second sets of wedge portions include wall engaging teeth on the sides thereof opposite to said complementary shaped teeth, the central points of the tips of said wall engaging teeth on each of said wedge portions defining the locus of points on a concavely curved line.

8. An anchor fastener in accordance with claim 6 wherein the retaining surfaces of said complementary shaped teeth include inner and outer peripheral edges which are concave on one of said sets of ratchet toothed wedge portions and convex on the other.

References Cited

UNITED STATES PATENTS

| | | | |
|---|---|---|---|
| 1,318,680 | 10/1919 | McNeill | 85—72 |
| 1,494,955 | 5/1924 | Hauck | 85—79 |
| 1,798,273 | 3/1931 | Pleister | 85—79 |
| 2,362,969 | 11/1944 | Boelter | 85—79 |
| 2,748,594 | 6/1956 | Edwards | 85—79 |
| 3,172,329 | 3/1965 | Setzler | 85—72 |
| 3,332,312 | 7/1967 | Bixby | 85—83 |
| 3,455,200 | 7/1969 | Cumming | 85—79 |

FOREIGN PATENTS

| | | |
|---|---|---|
| 956,348 | 8/1949 | France. |
| 1,163,277 | 2/1964 | Germany. |

MARION PARSONS, JR., Primary Examiner

U.S. Cl. X.R.

85—79

United States Patent Office 3,518,915
Patented July 7, 1970

3,518,915
ONE-PIECE EXPANDABLE ANCHOR FASTENER
Charles E. Gutshall, Roselle, Ill., assignor to Illinois Tool Works Inc., Chicago, Ill., a corporation of Delaware
Filed Nov. 1, 1968, Ser. No. 773,373
Int. Cl. F16b 13/04
U.S. Cl. 85—72    8 Claims

ABSTRACT OF THE DISCLOSURE

One-piece fastener for use in pre-drilled holes in materials such as concrete, has a pair of axially spaced wedge-like cooperable shank portions which are frangibly connected to each other and positioned within the hole when the forward tip of the fastener is engaged with the bottom of the hole. A percussive blow applied to the rear end of the fastener causes the frangible connection to fracture and permits ratchet toothed sections formed on the spaced shank portions to ride over and partially past one another so as to force each other radially outwardly into locking engagement with the walls of the hole. A knurled section on the shank may be provided to hold and maintain the ratchet teeth engaged under vibratory conditions. A method of making the fastener is also disclosed wherein a head portion is formed on the wire stock material to facilitate the manufacture of the fastener, the head being removed after the wedge-like portions are formed.

BACKGROUND OF THE INVENTION

Field of the invention

This invention relates to fasteners and particularly to expandable or wedge-type fasteners.

Description of the prior art

This invention is an improvement over the multi-part expansion type devices which have commonly been used to anchor studs, wire ties and similar fastener devices to holes in concrete, metal, or other hard materials. Certain devices which are commercially available incorporate lead sleeves which must be expanded against the sides of the hole by means of a setting tool. Aside from the fact that such devices are not formed in one piece and require a setter, it is also true that they are not very capable of resisting bending or side loads applied to the fasteners outside the hole since the lead which surrounds the anchor is driven to the bottom of the hole so as to leave the anchor spaced from, and unsupported by, the walls of the hole near its top. Another typical type of anchor which is available has a series of slits on its sides at its forward end which permit the portions between the slits to be driven radially outwardly into contact with the walls of a hole as the fastener is driven axially against a tapered expander plug. This latter type of anchor has good contact with the walls of the hole but is expensive to manufacture.

One-piece expansion type fastener devices incorporating a deformable or frangible connection between different portions of the shank as shown in U.S. Pat. 1,798,273, are known. However, such devices offer extremely little resistance to pull-out and are thus relatively ineffective.

SUMMARY

It is an object of this invention to provide a one-piece anchor fastener for use in concrete, stone, metal and similar material which is extremely resistant to pull-out forces and vibration and yet is extremely economical to manufacture and use.

Another object of the invention is to provide a one-piece anchor fastener which can be fastened in a hole by hammer blows applied directly to the fastener without requiring the use of setting tools and without damage to threads which may be formed on the fastener.

Yet another object of my invention is to provide a pair of cooperating sections on a one-piece fastener which are adapted to cooperate with each other to wedge the shank of the fastener into the walls of the hole in which it is anchored and lock it against removal.

A still further object of my invention is to form a one-piece anchor fastener by a process which is highly adapted to automation.

These objects are obtained by the anchor fastener of the present invention wherein a length of rod or wire stock is deformed between a pair of dies at its forward end to provide a pair of axially spaced ratchet-toothed wedge-like portions. The wedge-like portions are connected to each other by a thin frangible section which is adapted to be fractured when a hammer blow is applied to the rear end of the fastener. The locus of the tips of the ratchet teeth on each of the pair of cooperating wedge-like portions of the shank lie on a convex curve which permits the wedge-like portions to slide over and radially outwardly toward the walls of the hole as they are driven toward each other by a hammer blow on the rear end of the fastener. The fastener shank is preferably of less diameter than the diameter of the hole into which the fastener is placed. However, by knurling or otherwise enlarging the diameter of a portion of the shank spaced rearwardly from the wedge portions to a size close to, or slightly larger than the size of the hole, the fastener shank is not only firmly held in contact with the hole, but is firmly and resiliently held against vibration forces since the driving of the wedge portions together causes the forward portion of the shank to bend relative to the knurled portion and a threaded or other type of fastener portion formed on the portion of the shank which is positioned outside of the hole. In addition to the previously noted pair of ratchet teeth portions which engage each other, the shank also has a pair of wall engaging toothed portions formed thereon on the sides thereof opposite to the pair of ratchet toothed portions. These additional teeth, which have the locus of their tips on a concave outward curve, are driven into the walls of the hole by the wedging action of the ratchet teeth and serve to lock the fastener to prevent its being withdrawn from the hole.

The fastener can be readily produced on conventional types of automatic equipment by first forming a thin head at one end of a piece of round stock by means of a cold heading operation. The head is used for feeding and orienting a piece of rod stock as the stock is engaged by a forming die in a punch press wherein the teeth are formed and then by a threading die. Since the head is formed at the end of the shank which is inserted in the hole, the head must be removed and this may be done at the same time that the rod is threaded or during a subsequent operation.

The foregoing and other objects, features and advantages will be apparent from the following more particular description of a preferred embodiment, as illustrated in the accompanying drawings.

BRIEF DESCRIPTION OF THE DRAWINGS

FIG. 1 is a side view showing the improved fastener of my invention in the position which it assumes when dropped into a hole in a concrete structure;

FIG. 1A is a sectional view taken on line 1A—1A of FIG. 1;

FIG. 2 is a side view similar to FIG. 1 showing the fastener in the position it assumes after being driven into the hole by a percussive force applied at its terminal end;

PO-1050
(5/69)

UNITED STATES PATENT OFFICE
CERTIFICATE OF CORRECTION

Patent No. 3,518,915  Dated July 7, 1970

Inventor(s) C. E. Gutshall

It is certified that error appears in the above-identified patent and that said Letters Patent are hereby corrected as shown below:

Cl. 1 line 4, insert --set-- after "first"

SIGNED AND
SEALED
OCT 20 1970

(SEAL)
Attest:

Edward M. Fletcher, Jr.
Attesting Officer

WILLIAM E. SCHUYLER, JR.
Commissioner of Patents